(12) United States Patent
Boersig et al.

(10) Patent No.: US 8,201,447 B2
(45) Date of Patent: Jun. 19, 2012

(54) PROCESS FOR MEASURING A FILL LEVEL OR LIMIT STATE, CIRCUIT FOR A DEVICE THAT MEASURES A FILL LEVEL OR LIMIT STATE, AND DEVICE THAT MEASURES A FILL LEVEL OR LIMIT STATE

(75) Inventors: Joerg Boersig, Schapbach (DE); Josef Fehrenbach, Haslach (DE); Martin Mellert, Steinach (DE)

(73) Assignee: Vega Grieshaber KG, Wolfach (DE)

( * ) Notice: Subject to any disclaimer, the term of this patent is extended or adjusted under 35 U.S.C. 154(b) by 428 days.

(21) Appl. No.: 12/461,260

(22) Filed: Aug. 5, 2009

(65) Prior Publication Data

US 2010/0083751 A1   Apr. 8, 2010

Related U.S. Application Data

(60) Provisional application No. 61/136,041, filed on Aug. 8, 2008.

(30) Foreign Application Priority Data

Aug. 8, 2008   (EP) ..................................... 08014195

(51) Int. Cl.
  *G01F 23/22* (2006.01)
(52) U.S. Cl. .................................................... 73/290 V
(58) Field of Classification Search ................. 73/290 V
  See application file for complete search history.

(56) References Cited

U.S. PATENT DOCUMENTS

| 8,052,266 B2 * | 11/2011 | Nishihara ..................... 347/93 |
| 2006/0053863 A1 | 3/2006 | Griessbaum et al. |

FOREIGN PATENT DOCUMENTS

| DE | 44 39 879 C1 | 2/1996 |
| DE | 101 61 071 A1 | 6/2003 |
| EP | 0 568 521 A1 | 11/1993 |
| EP | 1 156 305 A1 | 11/2001 |
| EP | 1 580 539 A1 | 9/2005 |
| WO | WO 03/050479 A1 | 6/2003 |

* cited by examiner

*Primary Examiner* — John Chapman, Jr.
(74) *Attorney, Agent, or Firm* — The Nath Law Group; Jerald L. Meyer; Stanley N. Protigal

(57) ABSTRACT

Measuring a fill level or limit state is performed using an electromagnetic vibrating system, in which a transmission signal(s) is generated. A vibrating body (20) is excited into a state of vibration by the transmission signal (s); and by means of the reception signal (e) that is then produced by the vibrating body (2) the transmission signal (s) is modified for at least one subsequent excitation of the vibrating body (2), while a natural frequency (fe) of the vibrating body—or a magnitude (te) dependent on the natural frequency (fe)—is determined from the reception signal (e), and the transmission signal (s) is thereby modified.

9 Claims, 2 Drawing Sheets

Figure 1:
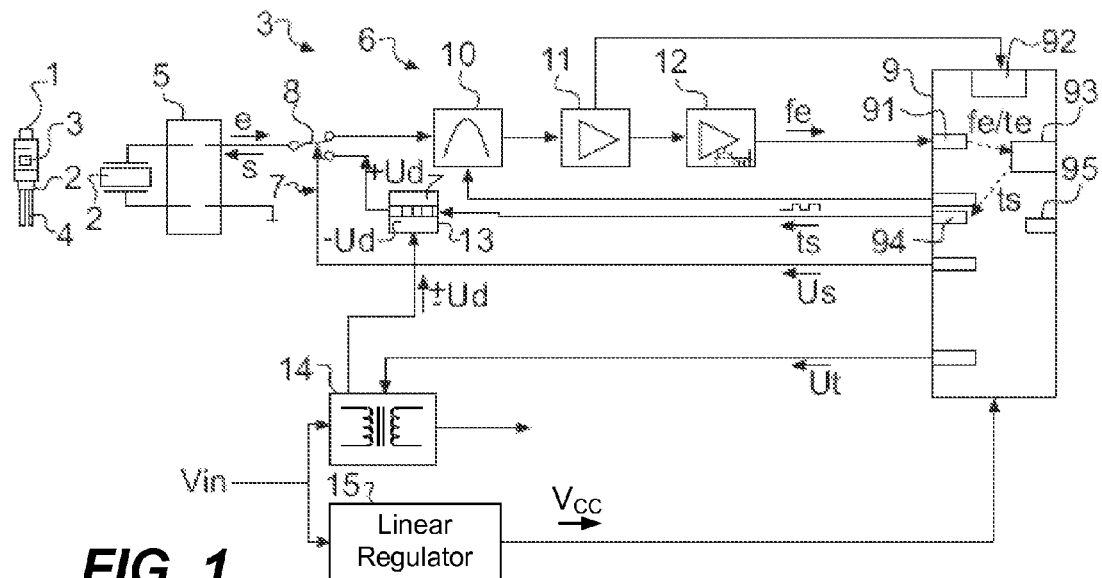

PROCESS FOR MEASURING A FILL LEVEL OR LIMIT STATE, CIRCUIT FOR A DEVICE THAT MEASURES A FILL LEVEL OR LIMIT STATE, AND DEVICE THAT MEASURES A FILL LEVEL OR LIMIT STATE

This is a Non-Provisional Application claiming the benefit under 35 USC 119(e) of U.S. Provisional Patent Application No. 61/136,041, filed on Aug. 8, 2008, and claiming the benefit of European Patent Application No. 08014195.5, filed on Aug. 8, 2008, the entire content of each of which is hereby incorporated by reference in its entirety.

The invention relates to a process for measuring a fill level or limit state, with an electromagnetic or piezoelectric vibrating system, in which a transmission signal(s) is generated, a vibrating body is excited into vibration by the transmission signal(s), as well as to a device and a circuit for a device that measures a fill level or limit state.

DE 102 03 461 A1 describes a device circuit for measuring a limit state, with a transmission circuit which is switched to provide a transmission signal; with a circuit, which is switched to at least one vibrating-body terminal or connector in order to selectively apply or cut off the transmission signal; with a reception circuit, which is switched to the one or more vibrating-body connectors in order to tap a reception signal; and with a modifying circuit, which is switched between the reception circuit and the transmission circuit in order to modify the transmission signal, as dependent on an already received reception signal. The modifying circuit is designed in such a way that a transmission signal with a plurality of successive and differing frequencies is applied to the vibrating body, which is secured to the vibrating-body connector. The reception signal which is thereupon measured can then be examined to determine the degree to which the different frequencies were damped.

According to the prior art described in the cited document, circuits have been known heretofore having a feedback loop with a back-coupled amplifier circuit, in order to provide as suitable as possible a transmission signal for exciting the vibrating element.

Thus vibrational limit-state sensors are generally known which have a fork with an inductive drive. The inductive drive, which here takes the form of a coil, simultaneously serves to excite the fork as a transmitter and, as a receiver, to receive vibrations from the fork. Also known is the use of a piezoelectric element as transmitter and receiver, instead of an inductive drive with a coil.

All of these circuits are disadvantageous in that they involve a high structural expense and a very expensive signal processing system. In particular, they demand an additional receiver element which can process the received vibration, as well as the corresponding temperatures in the area around the circuit configuration and the vibrating element.

A goal is to provide a process for measuring a fill level or limit state; a circuit for a device measuring a fill level or limit state; and a device for measuring a fill level or limit state, all in such a way as to permit a more simple structural design and a simplified control system.

This goal is achieved by a process for measuring a fill level or limit state, in which a natural frequency (fe) of the vibrating body, or a magnitude (te) dependent on the natural frequency (fe), is determined from the reception signal (e) and the transmission signal (s) is thereby modified, as well as by a device and a circuit for implementing this technique.

Of special advantage is a process for measuring a fill level or limit state with an electromagnetic vibrating system in which a transmission signal is generated, by means of which a vibrating body is electromechanically excited into vibration and a reception signal, which is then generated by the vibrating element, is used to modify the transmission signal for at least one subsequent excitation of the vibrating body when the natural frequency of the vibrating element, or a magnitude dependent on this natural frequency, is determined from the reception signal and when the transmission signal is thereby modified.

In particular, the vibrating element may be a piezoelectric element or an inductive element, such as a coil.

It is preferred that a new cycle period for the transmission cycle, or a new frequency for the transmission frequency of the transmitted signal, is determined from the natural frequency or from the magnitude dependent on the natural frequency, e.g., a cycle length corresponding to this natural frequency. In this way, the transmission signal that is then applied can excite the vibrating body with its own natural frequency.

The reception signal measured during a pause in transmission is used to determine the natural frequency. The natural frequency then comprises only vibrational portions of the natural frequency, since it is not disrupted by an active transmission signal.

The frequency of the transmission signal will preferably be tracked or updated in accordance with the natural frequency. In other words, the transmission signal should be applied with a transmission frequency which correspond as precisely as possible to the natural frequency of the vibrating body.

Also preferred is a circuit for fill-level or limit-state measuring device, with a transmission circuit that is switched to provide a transmission signal; with a switch which is selectively switched to at least one vibrating-body connector in order to apply or cut out the transmission signal; with a reception circuit which is switched to at least one vibrating-body connector in order to tap a reception signal; and with a modifying circuit which is switched between the reception circuit and the transmission circuit in order to modify the transmission signal, as dependent on a previously received reception signal. From the reception signal, a natural-frequency identifying configuration identifies the natural frequency of an attachable vibrating body, or identifies a magnitude dependent on the natural frequency, and a transmission-signal modifying configuration is designed to modify and make available the transmission signal as a function of the natural frequency or a magnitude dependent on the natural frequency.

From the natural frequency, or the magnitude dependent on the natural frequency, the circuit specifically determines a new cycle length for the transmission cycle or a new frequency for transmitting the transmission signal. The circuit is preferably designed or switched in such a way that the natural frequency, or the magnitude dependent on the natural frequency, is determined from the reception signal measured during a pause in the transmission of the transmission signal. In particular, the circuit is so designed or switched that the frequency of the transmission signal is tracked or updated in accordance with the natural frequency.

The components of the circuit may consist entirely or individually of hardware components or components controlled by software, such as a processor. In the context of the present description, the vibrating body is basically understood to be the electromagnetically activated element. In its actual realization, however, this electromagnetic vibrating element usually is also connected to a vibration sensor in the form of a solid body of large dimensions, for the purpose of exciting this vibration sensor into vibration or receiving vibrations from the solid body. When an inductive drive is employed, an advantageous feature is provided in that the same coil can be used to transmit and to receive. The same principle is also possible with a piezoelectric element, which is alternately driven as a transmitter or a receiver.

The fundamental concept of the present design therefore consists in the fact that an optimally suited transmitting frequency is determined for the transmission signal in the initial process stages, at or before the time when measurements begin. During the entire subsequent measuring cycle, the transmitting frequency can be advantageously monitored in continuous fashion and corrected when necessary.

Figure 2:
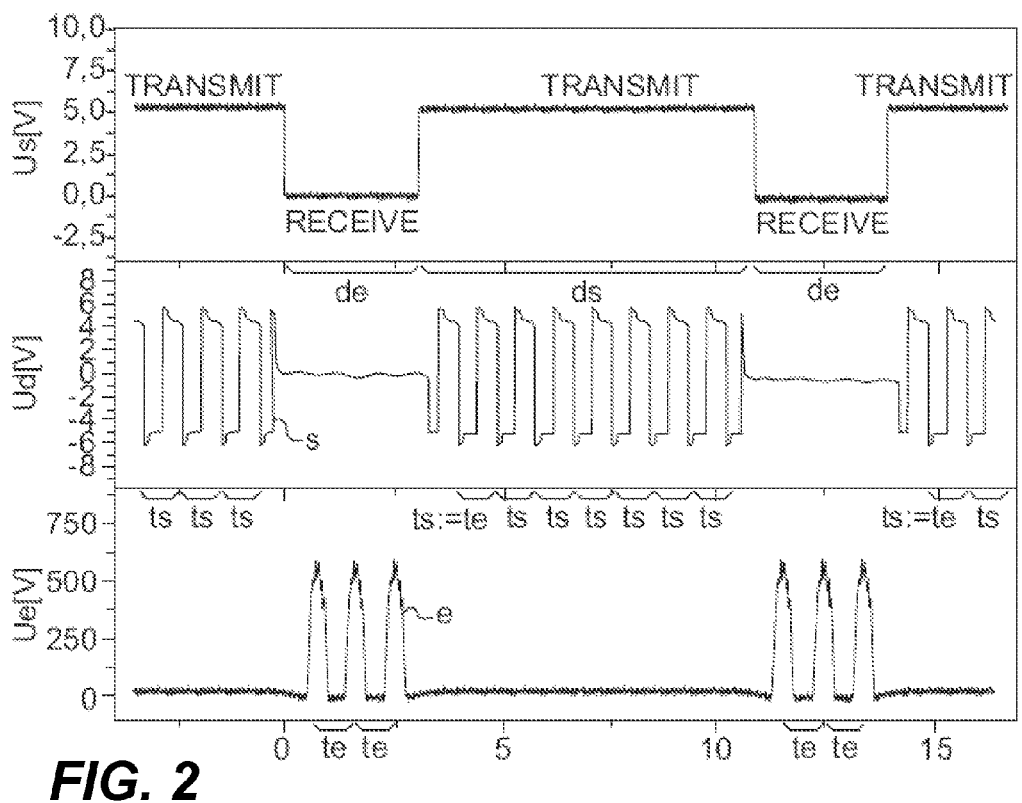
Figure 3:
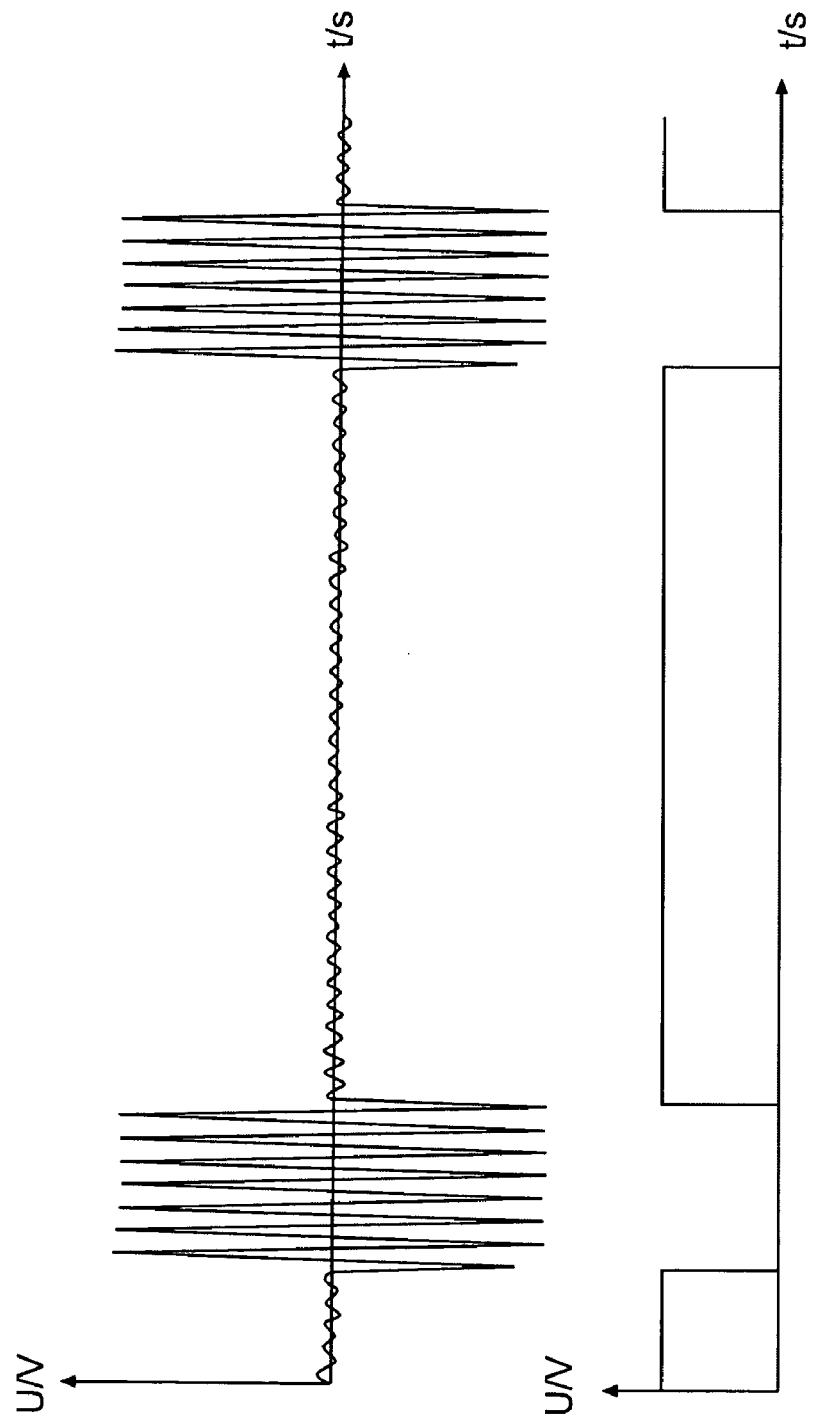

An exemplary embodiment is next described in greater detail on the basis of the drawing. Shown are:

FIG. 1 the components of a fill-level or limit-state measuring device, with a preferred circuit arrangement FIG. 2 various signal curves for this arrangement, specifically for the evaluation of a half-wave only FIG. 3 the signal curve for an advantageous evaluation of the complete alternating signal Ue.

FIG. 1 shows a preferred fill-level or limit-state measuring device, consisting of a housing whose front side contains a vibrating body 2 that can be excited by a circuit 3. The circuit 3 simultaneously serves to evaluate signals received from the vibrating body 2. Positioned on the front of the vibrating body 2 is a vibration sensor 4 which, in its capacity as a solid body, transmits the vibrations of the vibrating body into a container and simultaneously serves to receive vibrations from the container and transmit them to the vibrating body 2.

The vibrating body 2 is coupled to the circuit 3 by means of a vibrating-body connector or terminal 5. The vibrating-body connector 5 can also be designed as a plug connector. In principle, however, a permanent connection is also possible between the circuit 3 and the vibrating body 2, as realized upon installation into the actual measuring device.

The circuit 3 basically depicts only those components which are useful in understanding the structural design and the operation of the signal processing system in a preferred version. The connector contacts, for the vibrating-body connector 5, preferably two in number, comprise a ground or base terminal for applying the base or reference voltage of the measuring device, and a signal connector over which a transmission signal s or a reception signal e are transmitted.

A switch 8 is positioned at an input or output of the circuit 3, which can be connected to the signal connector for the vibrating body 2. The switch 8 connects the vibrating body 2 selectively to a reception circuit 6 or a transmission circuit 7. A suitable switch signal for operating the switch 8 is preferably provided by a processor 9 or another suitable circuit. The processor 9 is preferably designed as a microprocessor and serves as a modifying circuit.

Proceeding from the connector at the switch 8, the reception circuit 6 preferably consists of a filter 10, and the reception signal e provided by the vibrating body 2 is fed to this filter 10. The filter parameters for the filter 10 can be advantageously adjusted by the processor. A filtered signal emitted by the filter 10 is applied to an amplifier 11, which serves to amplify the filtered signal.

The amplifier 11 applies this reinforced signal to a comparator 12, which is specifically designed to perform a zero-crossing determination. This makes it possible to measure the frequency of the reception signal e, so as to determine a natural frequency fe. The comparator 12 applies the natural frequency fe to the processor 9. In particular, the natural frequency fe is applied to a timing device 91, which may be designed as a component of the processor 9.

The frequency may also be determined by an FFT (fast Fourier transform), by importing the signal directly after the filter or the first amplifier using an AD transformer.

To measure the amplitude of the reception signal e, a corresponding measuring signal is also fed to an analogue/digital transformer 92, which may, as one option, be a component of the processor 9. Communication with an external device may occur over an interface 95, e.g., to receive control instructions or to issue measuring data.

The timing device 91 may be advantageously designed as a separate component or as a component belonging to a larger clock control system 93. A timer 94 is provided in addition, which may also be designed as a component belonging to the processor 9 or to a modifying device serving as processor 9. The timer 94, which may optionally be a component of the clock control system 93, provides the frequency output and in particular provides a clock signal is to a driver stage 13. The driver stage 13 provides the transmission signal s, which is applied to the switched or switchable connector of the switch 8.

A so-called step-up DC/DC transformer provides a driver voltage Ud, which is applied to the driver stage 13. The driver stage can accordingly apply the positive driver voltage +Ud or the negative driver voltage −Ud to the switch 8. The step-up DC/DC transformer 14 is provided with a supply voltage Vin, which can also be advantageously applied to a linear regulator 15. The latter serves to provide a positive supply voltage Vcc, which in turn serves, among things, to supply the processor 9 or the modifying circuit. A programmable driver voltage Ut can be advantageously piloted by the processor 9, or the modifying circuit, through the provision of an in/out signal that is applied to the step-up DC/DC transformer 14.

The processor 9, or the modifying circuit it helps form, thus specifically has a natural-frequency identifying configuration, in the form of the comparator 12 as well as other components, which ascertain the natural vibration or natural frequency fe of the vibrating body 2, with a vibration sensor 4. In place of the direct determination of a value for the natural frequency fe, a magnitude dependent on that value can naturally be determined, e.g., the cycle length of a signal received from the vibrating body 2. In addition, the modifying circuit has a transmission-signal modifying configuration, which specifically includes the timer 94, in combination with the driver stage 13. The timer 94 emits the clock signal is as a transmission cycle, which corresponds to a new cycle length employed to generate the subsequent transmission signal s. As dependent on this new cycle length, the driver stage 13 provides a transmission signal s, which excites the vibrating body 2 to its natural frequency fe with a suitable succession of signals; in the process, the resonant frequency is advantageously transmitted to the vibrating body 2 by the transmission signal 2.

FIG. 2 shows different signal curves or sequences. The signal depicted in the uppermost diagram corresponds to a circuit voltage Us, which is specifically used for switching the switch 8. Shown are the switching times for transmitting and receiving, during which the switch 8 connects the vibrating body 2 either to the driver stage 13 (or, as the case may be, the transmission circuit 7) or to the reception circuit 6 (or, as the case may be, the filter 10). It can be seen that a receiving period de and a transmitting period ds are so selected with respect to duration that they advantageously exceed several periods of the natural frequency fe of the vibrating body and its continuation.

In the center diagram the time curve for the transmission voltage Ud is delineated as a transmission signal s applied to the switch 8 and the vibrating body 2. Even though it is not evident from the scale of the diagram, the cycle length of the transmission cycle ts usually varies from one transmission cycle to the next, particularly at the beginning of operation. Within a given transmission length ds of a transmission cycle, the cycle length or, as the case may be, the clock signal ts of the transmission cycle advantageously remains constant.

The lowermost diagram shows the reception signal e or its reception voltage Ue, which is rectified in the depiction. During the reception period de, it is possible to identify the plurality of received signals; with respect to their duration, these signals correspond to the natural frequency fe of the vibrating body 2 and its vibrating sensor 4. It is thus possible to determine the length, or cycle length, of the received signals, specifically as a dependent magnitude te. This magnitude can be used to adjust the length of the clock signal ts of the next transmission cycle, so that the transmission signal s advantageously excites the vibrating body 2 to its own natural frequency.

In a corresponding process sequence the processor 9 transmits, e.g., 100 periods of a desired frequency to the vibrating body 2, which serves as a transmitter. After the transmission time for this number of periods, the switch 8 switches operation to receiving mode. The decay frequency of a vibrating system is always the natural resonance or natural frequency fe and not, as a rule, the transmitted frequency. If the received amplitude of the reception signal e is sufficiently large, its frequency can be determined; this frequency corresponds to the natural frequency fe. Then the next transmitting frequency is established as a new transmitting frequency for the following transmission signal s, in accordance with the natural frequency thus determined. Through suitable control of the transmitting frequency, the vibrating device can be operated on the basis of its mechanical resonant frequency.

Regarding the excitation of the vibrating body 2, or its reception signal e, it must be noted that actual practice always has to take into account the vibration sensor 4, since this has an essential influence on the characteristics of the vibrating device. Until the mechanical resonant frequency or vibrating frequency is found through the application of suitable search algorithms, subsequent operation requires only that the transmitting frequency be updated, when the need arises. The variable relation between transmission and reception generates broadband transmission signals that are necessary for exciting a narrowband system.

The invention claimed is:

1. Process for measuring the fill level or limit state with an electromagnetic or piezoelectric vibrating system, in which
a transmission signal (s) is generated,
a vibrating body (2) is excited into vibration by the transmission signal (s),
the reception signal (e) which is then produced by the vibrating body (2) is used to modify the transmission signal (s) for at least one subsequent excitation of the oscillating body (2),
wherein
a natural frequency (fe) of the vibrating body, or a magnitude (te) dependent on the natural frequency (fe), is determined from the reception signal (e) and the transmission signal (s) is thereby modified.

2. Process according to claim 1, in which a new cycle length for the transmission cycle (ts) or a new transmission frequency for the transmission signal (s) is determined from the natural frequency (fe) or from the magntitude (te) dependent on the natural frequency (fe).

3. Process according to claim 1, in which the reception signal (e) measured during a pause in the transmission of the transmission signal (s) is used to determine the natural frequency (fe).

4. Process according to claim 1, in which a transmission frequency for the transmission signal (s) is tracked or updated relative to the natural frequency (fe).

5. Circuit for a fill-level or limit-state measuring device, with
a transmission circuit (7) which is switched to provide a transmission signal (s),
a switch (8) which is switched selectively to at least one vibrating-body connector (5) in order to apply or cut off the transmission signal (s),
a reception circuit (6), which is switched to at least one vibrating-body connector (5) in order to tap a reception signal (e), and
a modifying circuit, which is switched between the reception circuit (6) and the transmission circuit (7) in order to modify the transmission signal, as dependent on the previously received reception signal (e),
wherein
the reception signal (e) is used by a natural-frequency identifying configuration to identify the natural frequency (fe) of an attachable vibrating body (2) or a magnitude (te) dependent on the natural frequency (fe), and
a transmission-signal modifying configuration modifies and makes available the transmission signal (s) as a function of the natural frequency (fe) or the magnitude (te) dependent on the natural frequency (fe).

6. Circuit according to claim 5, which determines a new cycle length for the transmission cycle (ts), or a new frequency for transmitting the transmission signal (s), from the natural frequency (fe) or from the magnitude (te) dependent on the natural frequency (fe).

7. Circuit according to claim 5, which is laid out or switched so as to determine the natural frequency (fe), or the magnitude (te) dependent on the natural frequency (fe), from the reception signal (e) measured during a pause in the transmission of the transmission signal (s).

8. Circuit according to claim 5, which is laid out or switched so as to track or update the transmission frequency of the transmission signal (s) in relation to the natural frequency (fe).

9. Fill-level or limit-state device (1), with
a circuit according to claim 5, and
a vibrating body (2) attached to the vibrating-body connector (5).

* * * * *